(12) United States Patent
Perkins et al.

(10) Patent No.: US 7,097,310 B2
(45) Date of Patent: Aug. 29, 2006

(54) CEILING-MOUNTED PROJECTION SYSTEM

(75) Inventors: Mervin Bruce Perkins, Arvada, CO (US); Eric John Perkins, Denver, CO (US); Lawrence Alexander Duarte, Littleton, CO (US); Kenneth Allen Bowers, Aurora, CO (US)

(73) Assignee: Display Devices, Inc., Arvada, CO (US)

( * ) Notice: Subject to any disclaimer, the term of this patent is extended or adjusted under 35 U.S.C. 154(b) by 151 days.

(21) Appl. No.: 10/958,950

(22) Filed: Oct. 5, 2004

(65) Prior Publication Data

US 2006/0072080 A1    Apr. 6, 2006

(51) Int. Cl.
*G03B 21/14* (2006.01)

(52) U.S. Cl. .......................... 353/99; 353/79; 353/122; 248/343

(58) Field of Classification Search .................. 353/79, 353/98, 99, 119, 121, 122; 248/343
See application file for complete search history.

(56) References Cited

U.S. PATENT DOCUMENTS

| | | | |
|---|---|---|---|
| 3,277,780 A | 10/1966 | Hartwig | |
| 3,488,115 A | 1/1970 | Nemec et al. | |
| 4,124,285 A | 11/1978 | Johnson et al. | |
| 4,639,106 A * | 1/1987 | Gradin | 353/13 |
| 5,160,951 A | 11/1992 | Lander | |
| 5,261,645 A * | 11/1993 | Huffman | 254/267 |
| 5,349,400 A * | 9/1994 | Kaplan et al. | 353/119 |
| 5,402,192 A | 3/1995 | Gelman | |
| 5,755,500 A | 5/1998 | Matsumoto et al. | |
| 5,865,519 A * | 2/1999 | Maass | 353/28 |
| 5,993,011 A | 11/1999 | Smock et al. | |
| 6,379,012 B1 | 4/2002 | Enochs et al. | |
| 2003/0160947 A1 | 8/2003 | Soper et al. | |

* cited by examiner

*Primary Examiner*—William C. Dowling
(74) *Attorney, Agent, or Firm*—Dorr, Carson & Birney, P.C.

(57) ABSTRACT

A ceiling-mounted projection system has a projector mounted above the ceiling, and a periscope assembly that can be moved by a motor along a vertical axis between a raised position in which the periscope assembly is retracted into the ceiling and a lowered position in which the lower portion of the periscope assembly extends below the ceiling. An upper mirror is mounted on the upper portion of the periscope assembly and aligned to reflect images from the projector in a downward direction when the periscope assembly is in the lowered position. A lower mirror is mounted on the lower portion of the periscope assembly and aligned to reflect the images from the upper mirror onto a viewing surface when the periscope assembly is in the lowered position.

15 Claims, 8 Drawing Sheets

CEILING-MOUNTED PROJECTION SYSTEM

BACKGROUND OF THE INVENTION

1. Field of the Invention

The present invention relates generally to the field of projection systems. More specifically, the present invention discloses a ceiling-mounted projector having a retractable periscope mount.

Statement of the Problem. Video projectors were first mounted to the ceiling as a convenient method of permanent installation. It allowed for the projector to be out of the way (i.e., above the audience) and immediately available. Three problems were created with this approach. First, it is visually unappealing. Many projectors are mounted in corporate board rooms or company training/sales rooms that are custom designed and valued at hundreds of thousands of dollars. The always-present projector, with cables hanging out, can be a significant distraction. The second problem is noise. Many projectors emit very disturbing noise that can interfere with board meetings, training sessions, teleconferencing, etc. This third problem is the theft. Video projectors are expensive and quite a target for thieves. Conventional ceiling-mounted projectors make easy targets.

One attempt to address some of these problems is the projector lift mount. The mount and projector are installed above the ceiling line. The mount lowers the projector during use. However, the structure used to lower the projector is large and unattractive, which still makes the room unattractive during use of the projector. This approach also does nothing to alleviate the noise issue.

Another approach employs a projector mounted above the ceiling line. The projected image bounces off an upper fixed mirror to a second mirror attached to a ceiling tile that rotates open. Due to the nature of the second mirror rotating about a fixed point, this has proved to be difficult to accurately set and maintain a precise image to the target screen.

2. Prior Art

The prior art in the field includes the following:

| Inventor | Patent No. | Issue Date |
| --- | --- | --- |
| Hartwig | 3,277,780 | Oct. 11, 1966 |
| Nemec et al. | 3,488,115 | Jan. 6, 1970 |
| Johnson et al. | 4,124,285 | Nov. 7, 1978 |
| Lander | 5,160,951 | Nov. 3, 1992 |
| Gelman | 5,402,192 | Mar. 28, 1995 |
| Matsumoto et al. | 5,755,500 | May 26, 1998 |
| Smock et al. | 5,993,011 | Nov. 30, 1999 |
| Enochs et al. | 6,379,012 | Apr. 30, 2002 |
| Soper et al. | Pub. 2003/0160947 | Aug. 28, 2003 |

Johnson et al. disclose a projector system for projecting a pattern on textile fabric on a cutting table. The projected pattern can be moved laterally across the width of the fabric to determine whether or not flaws in the fabric will be present in the area to be cut out according to the pattern. The projected image is reflected by two fixed mirrors 110 and 118 in a periscope-like arrangement.

Smock et al. disclose a projector mount system positioned within a ceiling grid with a vertical ventilation duct and exhaust fans. The image from the projector is reflected downward by an upper mirror onto a lower mirror that pivots.

Enoch et al. disclose an overhead projector mount system that employs a tilting mirror to project the image.

Nemec et al. and Soper et al. show examples of retractable overhead projectors with folding mirrors. The remaining patents by Hartwig, Lander, Gelman and Matsumoto et al. are only of passing interest.

Solution to the Problem. None of the prior art references discussed above show a ceiling-mounted projection system with a mirrors mounted in a periscope arrangement that can be raised to an inconspicuous position when the projector is not in use, and lowered below the ceiling to project images on a viewing surface in the room when the projector is in use. The present invention solves the problems of appearance, noise, and susceptibility to theft associated with conventional ceiling-mounted projection systems, while maintaining an accurate and reliable video image on the target screen.

SUMMARY OF THE INVENTION

This invention provides a ceiling-mounted projection system having a projector mounted above the ceiling, and a periscope assembly that can be moved by a motor along a vertical axis between a raised position in which the periscope assembly is retracted into the ceiling and a lowered position in which the lower portion of the periscope assembly extends below the ceiling. An upper mirror is mounted on the upper portion of the periscope assembly and aligned to reflect images from the projector in a downward direction when the periscope assembly is in the lowered position. A lower mirror is mounted on the lower portion of the periscope assembly and aligned to reflect the images from the upper mirror onto a viewing surface when the periscope assembly is in the lowered position.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
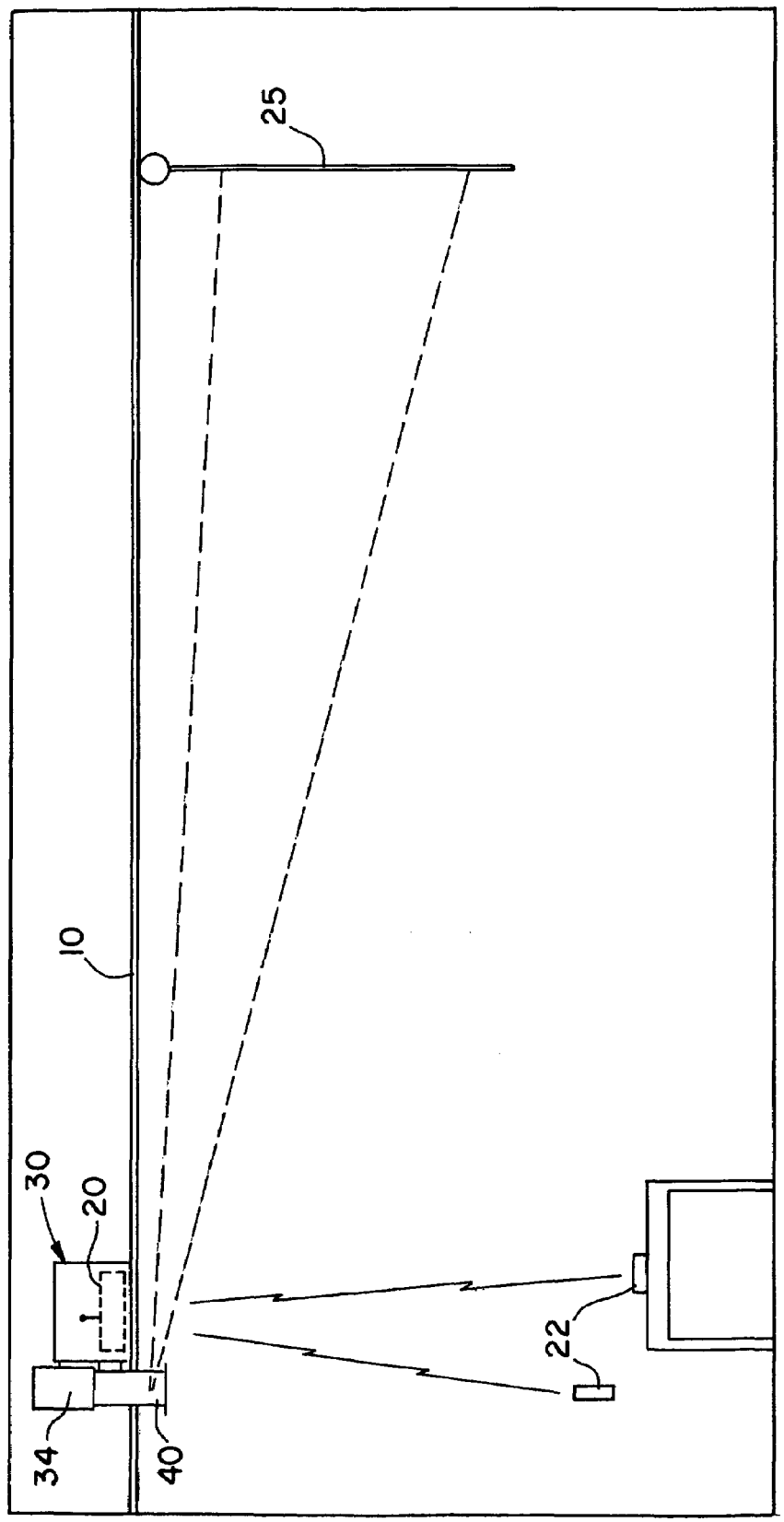
FIG. 1 is a vertical cross-sectional view of the projection system installed above a ceiling.
Figure 2:
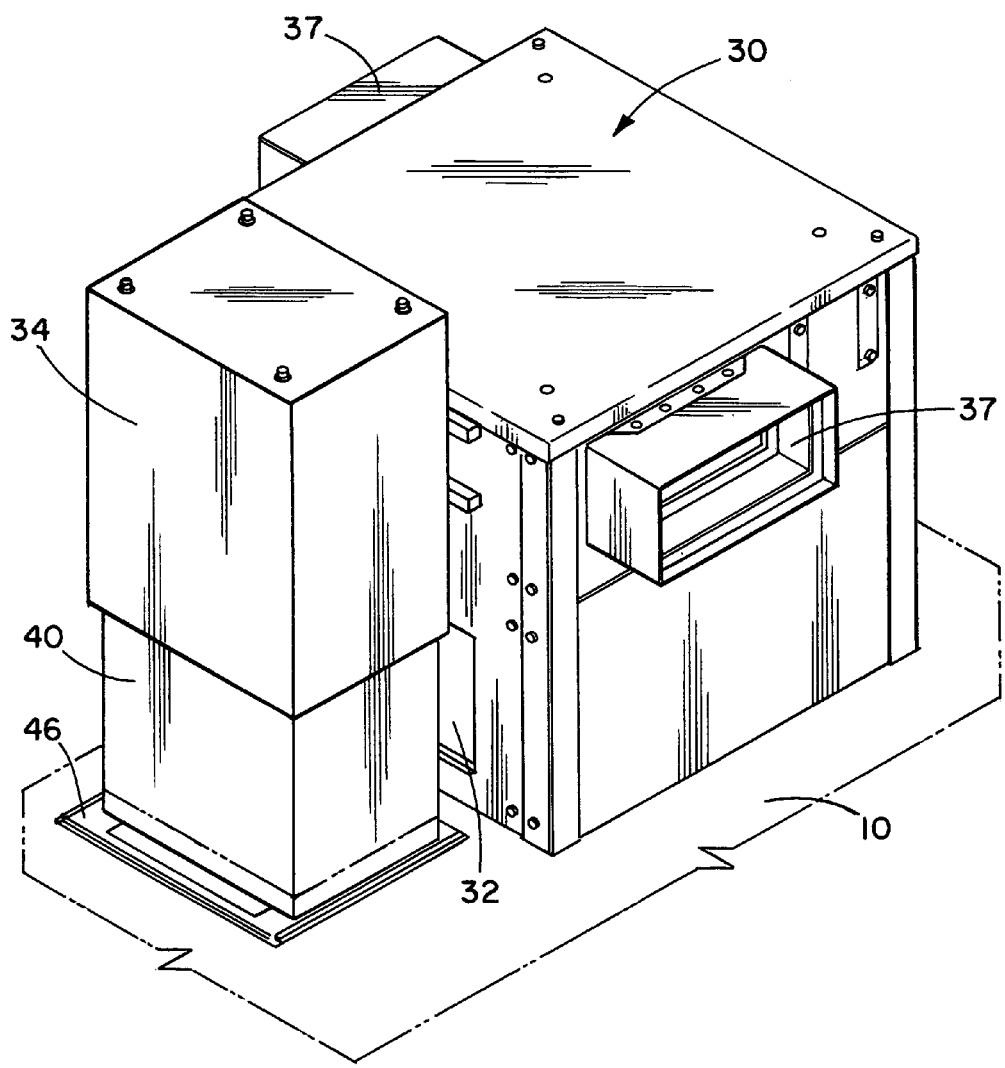
FIG. 2 is a perspective view of the projection system.

Turning to FIG. 1, a vertical cross-sectional view is provided of the projection system installed above a ceiling 10. FIG. 2 is a perspective view of the projection system. A primary component of the projection system is the projector housing 30, which provides an enclosed interior region to hold a conventional projector 20. For example, the projector housing 30 can be made of sheet metal. The projector housing 30 is mounted above the ceiling and is rigidly secured to support grid for the ceiling panels or to the beams above the ceiling. A hole must also be created through the ceiling 10 to allow operation of the periscope assembly 40 and enable images from the projector 20 to be projected onto a screen 25 in the room beneath the ceiling 10, as will be discussed below.

Figure 8:
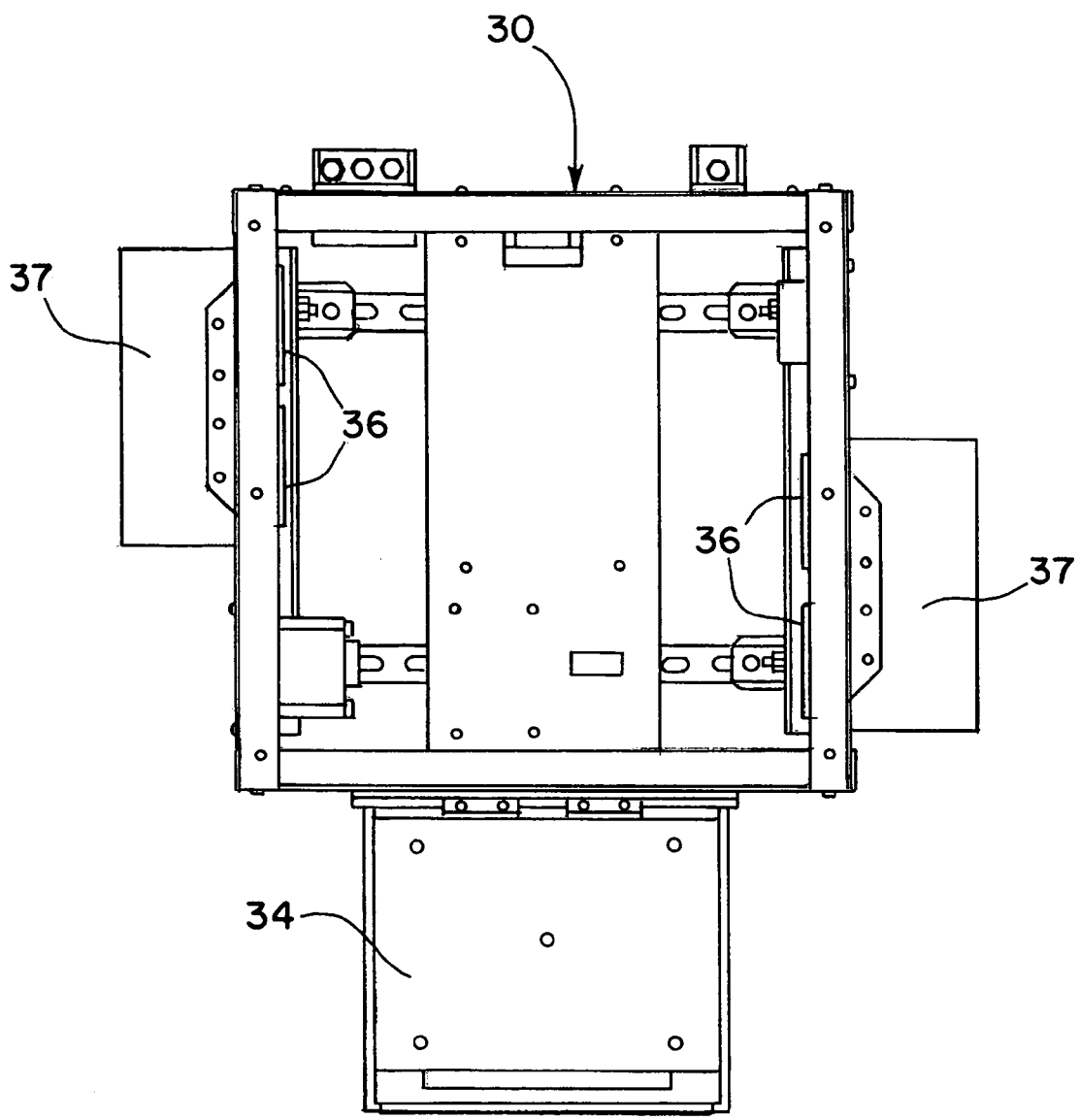
FIG. 8 is a top view of the projector housing 30 with the cover removed for clarity.
Figure 11:
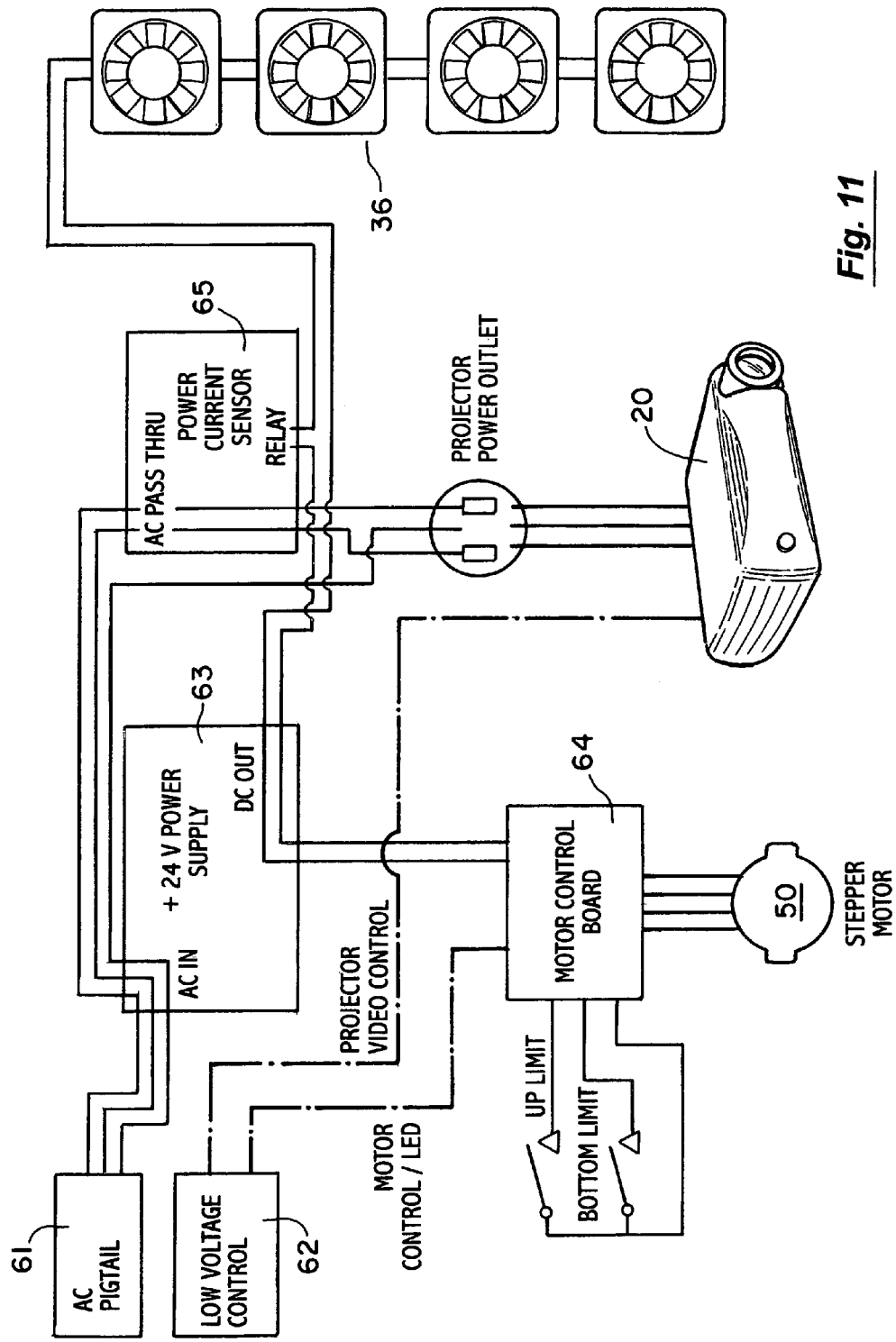
FIG. 11 is a schematic block diagram of the electrical components of the projection system.

The projector housing 30 can be equipped with a number of ventilation fans 36 and ventilation ports 37 to cool the projector 20. In the embodiment shown in the drawings, the projector housing 30 is plenum-rated with cross-ventilation provided by two sets of ventilation fans 36 and ventilation ports 37 on opposite sides of the upper portion of the projector housing 30. FIG. 8 is a top view of the projector housing 30 with the cover removed for clarity. The ventilation fans 36 can be controlled, as indicated in FIG. 11, so that they are turned on for cooling only when the projector 20 is on. Both sets of fans can be equipped with fire dampers.

Any of a wide range of conventional projectors 20 can be accommodated within the projector housing 30. For example, a slide projector, video projector or computer-display projector could be used. The projector 20 is usually equipped with a wired or wireless remote controller 22, as illustrated in FIG. 1, to enable a person in the room below to control operation of the projector.

Figure 3:
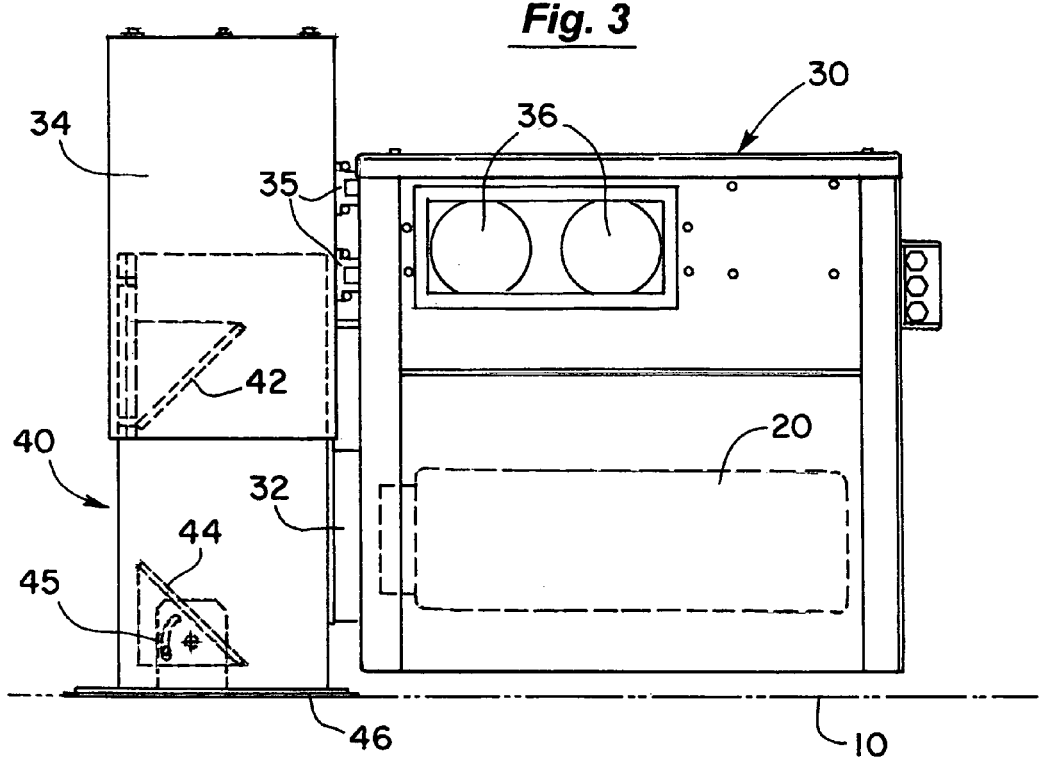
FIG. 3 is a vertical cross-sectional view of the projection system with the periscope assembly 40 extended.
Figure 4:
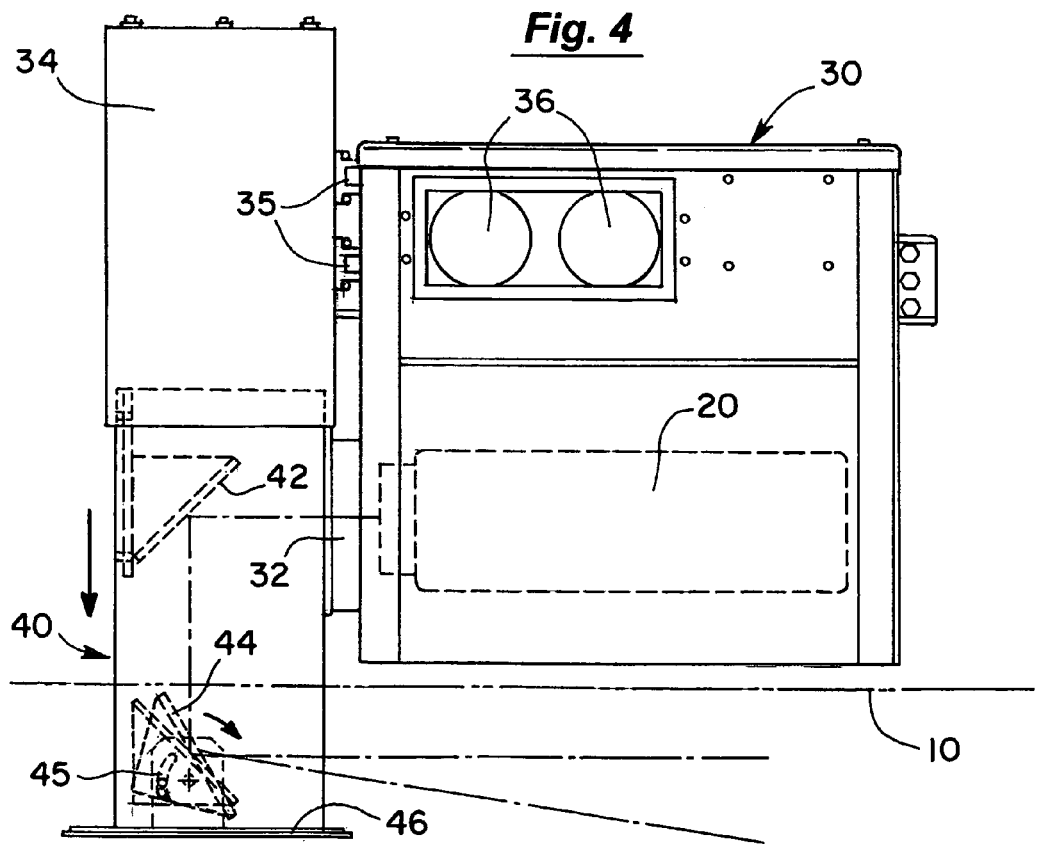
FIG. 4 is a vertical cross-sectional view of the projection system with the periscope assembly 40 retracted.

FIGS. 3 and 4 are vertical cross-sectional views illustrating operation of the periscope assembly 40. FIG. 3 shows the periscope assembly in the extended position, while FIG. 4 shows the periscope assembly in its retracted position when the projector 20 is not in use. In the embodiment of the invention shown in the drawings, the projector housing 30 includes a column assembly 34 having vertical cavity that receives the upper end of the periscope assembly 40 in a sliding or telescoping relationship along a vertical axis. This enables the periscope assembly 40 to move between its raised and lowered positions as depicted in FIGS. 3 and 4. Periscope assembly has approximately 8 inches of travel in the preferred embodiment.

Figure 5:
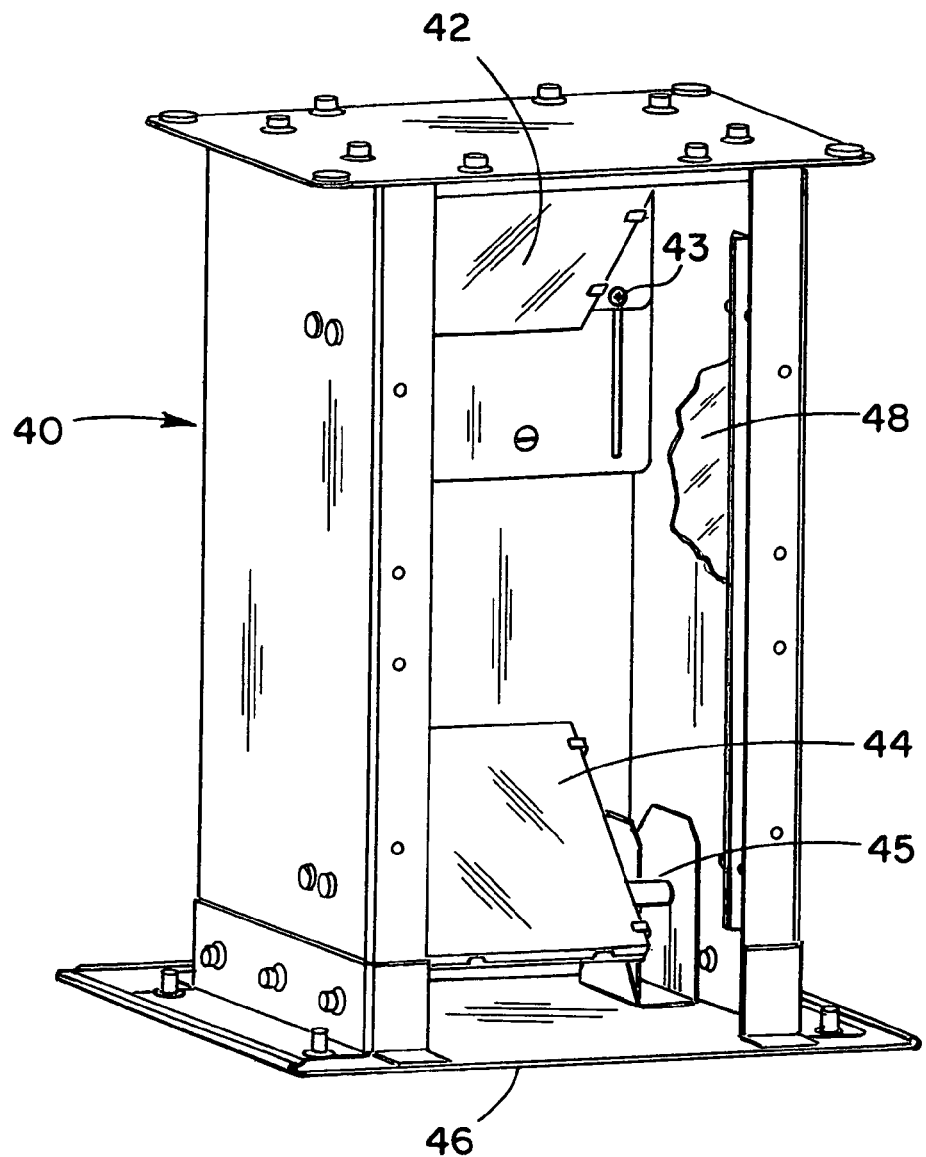
FIG. 5 is a perspective view of the periscope assembly 40.
Figure 7:
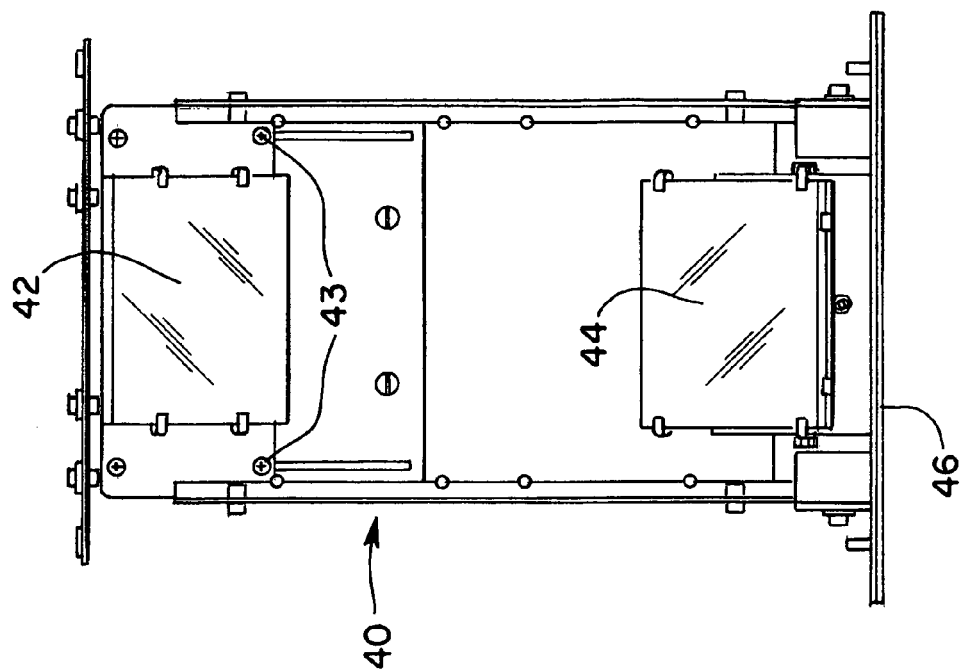
FIG. 7 is a front elevational view of the periscope assembly 40.
Figure 6:
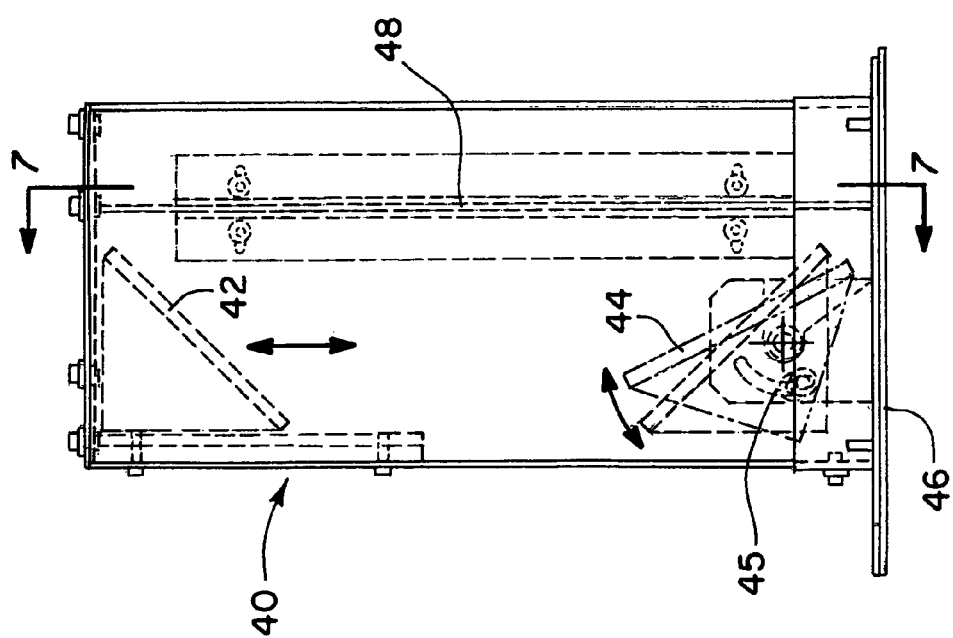
FIG. 6 is a vertical cross-sectional view of the periscope assembly 40.

An upper mirror 42 is secured to the upper portion of the periscope assembly 40 and is aligned to reflect images from the projector 20 in a generally downward direction when the periscope assembly 40 is in the lowered position. A lower mirror 44 is secured to the lower portion of the periscope assembly 40 and aligned to reflect the images reflected by the upper mirror 42 from the projector 20 onto the viewing surface 25 in the room below the ceiling 10 when the periscope assembly 40 is in the lowered position. FIG. 5 is a perspective view of the periscope assembly 40. FIG. 6 is a corresponding vertical cross-sectional view and FIG. 7 is a front elevational view of the periscope assembly 40.

The mirrors can be protected from dust by an optical-grade glass or plastic panel 48 extending across the vertical opening of the periscope assembly 40, as shown in FIG. 6. In addition, the projector 20 can be interfaced to the periscope assembly 40 through a shroud assembly 32. The shroud assembly 32 provides an enclosed optical path for the projector image into the periscope assembly 40 and helps to protect against dust. It should be readily understood that other optical configurations could be readily substituted for the upper and lower mirrors 42, 44. In addition, a rigid support member could be employed to hold the mirrors 42, 44 in place of an enclosed periscope assembly.

The tilt of the lower mirror 44 is adjustable to control placement of the projected image on the screen 25. In particular, FIG. 6 shows the tilt adjustment mechanism 44 for the lower mirror 44. The vertical position of the upper mirror 42 can be adjusted by means of nuts 43 that slide in slots in the rear of the periscope assembly 40, as shown in FIG. 7 to accommodate a range of projector lens heights. In addition, the column assembly 34 is horizontally adjustable to allow the mirrors 42, 44 to be aligned with the lens of the projector 20. For example, the embodiment shown in FIGS. 8–10 uses a series of horizontal slots in the projector housing 30 that can be engaged by bolts 35 extending from the periscope assembly 40. Alternatively, the periscope assembly 40 could incorporate a horizontal adjustment mechanism.

Figure 10:
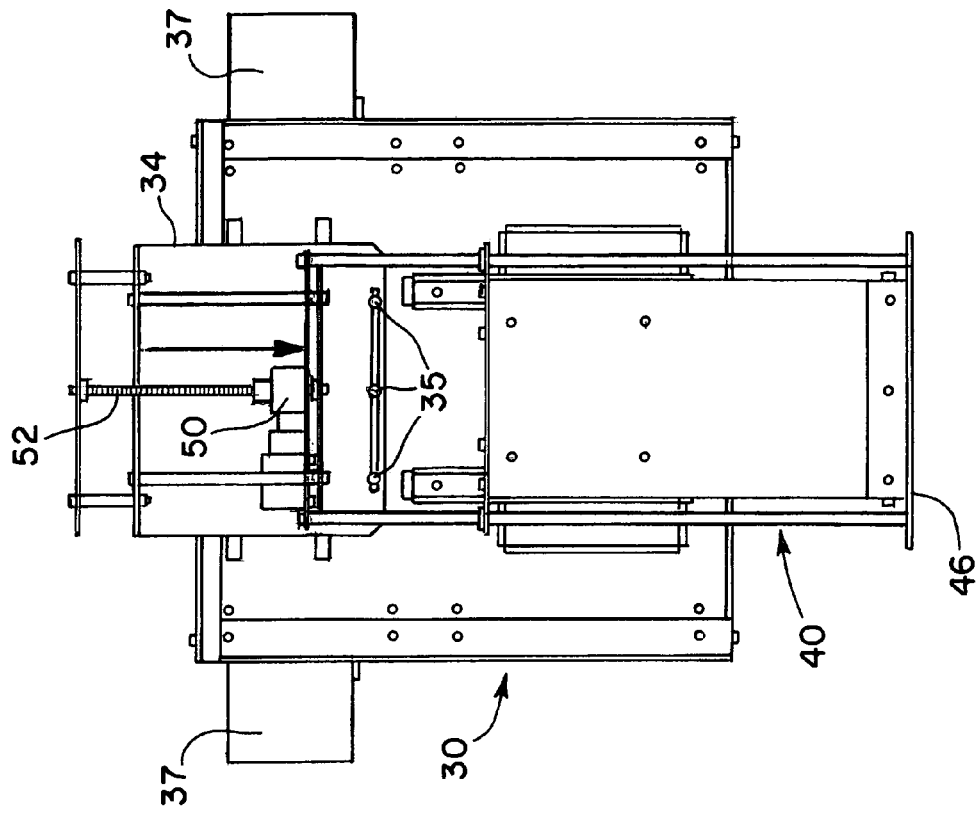
FIG. 10 is a side elevation view corresponding to FIG. 9 with the periscope assembly lowered.
Figure 9:
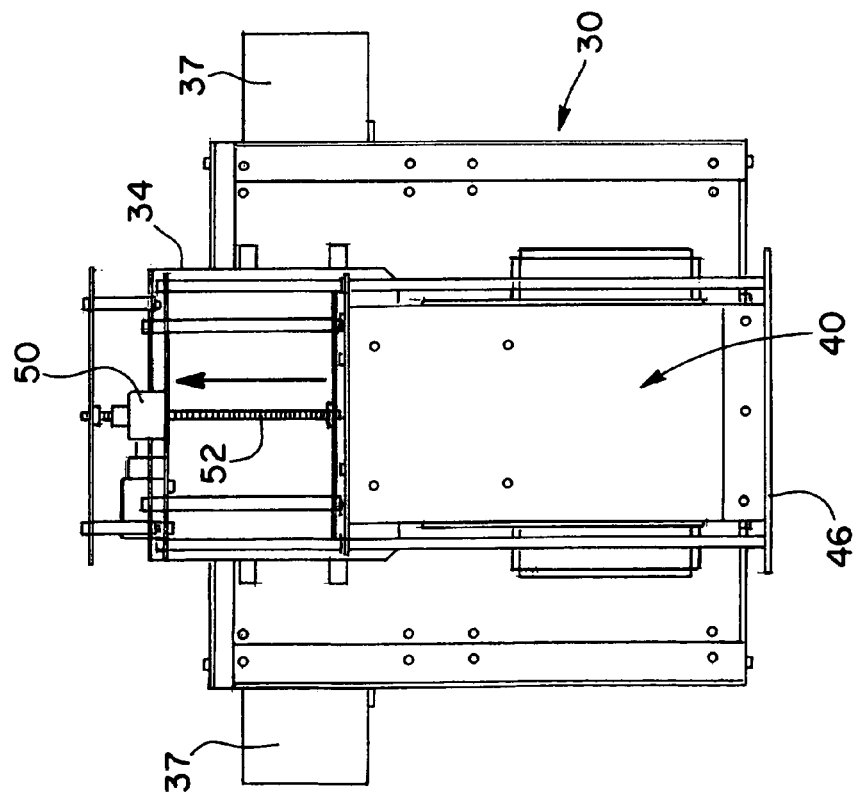
FIG. 9 is a side elevational view of the projection system with the periscope assembly raised.

The periscope assembly 40 is motorized allowing it to move between the raised and lowered positions. With a ceiling tile or closure panel 46 on the bottom of the periscope assembly 40, it would be almost invisible in the room when in the closed position. FIGS. 9 and 10 illustrate one type of the drive mechanism that can be used to raise and lower the periscope assembly 40. FIG. 9 is a side elevational view of the projection system with the periscope assembly 40 raised. FIG. 10 is a side elevation view corresponding to FIG. 9 with the periscope assembly 40 lowered. The stepper motor 50 mounted on the top of the periscope assembly 40 drives a worm gear 52 to move the periscope assembly 40 between the raised and lowered positions. However, other drive mechanisms could be readily substituted, such as a rack-and-pinion gear mechanism, cables, belts, or pulleys.

FIG. 11 is a schematic block diagram of the electrical components of the present invention. A motor control board 64 controls operation of the stepper motor 50 between the raised and lowered positions for the periscope assembly 40 fixed by two limit switches. A DC power supply 63 converts AC power 61 to power the ventilation fans 36 and motor control board 64. As previously mentioned, operation of the projector 20 is controlled by a remote controller 22 (in FIG. 1) which communicates with a low voltage controller 62. This low voltage controller 62 is wired to actuate the projector 20 and also the motor control board 64. A power current sensor 65 detects when the projector 20 is drawing power current and controls operation of the ventilation fans 36 accordingly.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A ceiling-mounted projection system comprising:
   a projector mounted above a ceiling for projecting images;
   a member having an upper portion and a lower portion, said member being movable along a vertical axis between a raised position in which the member is retracted into the ceiling, and a lowered position in which the lower portion of the member extends below the ceiling;
   an upper mirror secured to the upper portion of the member and aligned to reflect images from the projector in a downward direction when the member is in the lowered position; and a lower mirror secured to the lower portion of the member and aligned to reflect the images reflected by the upper mirror from the projector onto a viewing surface below the ceiling when the member is in the lowered position.

2. The projection system of claim 1 further comprising a motor selectively moving the member between the raised position and the lowered position.

3. The projection system of claim 2 further comprising a worm gear mechanism driven by the motor to move the member between the raised position and the lowered position.

4. The projection system of claim 1 further comprising a projector housing mounted above the ceiling containing the projector.

5. The projection system of claim 4 wherein the projector housing further comprises a ventilation fan drawing air through the projector housing to cool the projector.

6. The projection system of claim 1 wherein the lower mirror and lower portion of the member pass through an opening the ceiling in the lowered position, and further comprising a closure panel substantially covering the opening in the ceiling when the member is in the raised position.

7. A ceiling-mounted projection system comprising:
a projector housing mounted above a ceiling;
a projector within the projector housing for projecting images; and
a periscope assembly movable along a vertical axis in a telescoping relationship with the projector housing between a raised position in which the periscope assembly is retracted into the ceiling, and a lowered position in which the lower portion of the periscope assembly extends below the ceiling, said periscope assembly having:
(a) an upper mirror aligned to reflect images from the projector in a downward direction within the periscope assembly when the periscope assembly is in the lowered position; and
(b) a lower mirror aligned to reflect the images reflected by the upper mirror from the projector onto a viewing surface below the ceiling when the periscope assembly is in the lowered position.

8. The projection system of claim 7 further comprising a motor selectively moving the periscope assembly between the raised position and the lowered position.

9. The projection system of claim 8 further comprising a worm gear mechanism driven by the motor to move the periscope assembly between the raised position and the lowered position.

10. The projection system of claim 7 wherein the projector housing further comprises a ventilation fan drawing air through the projector housing to cool the projector.

11. The projection system of claim 7 wherein the lower mirror and lower portion of the periscope assembly pass through an opening the ceiling in the lowered position, and further comprising a closure panel substantially covering the opening in the ceiling when the periscope assembly is in the raised position.

12. A ceiling-mounted projection system comprising:
a projector housing mounted above a ceiling having:
(a) a ventilation fan; and
(b) a column assembly with a vertical cavity;
a projector within the projector housing for projecting images; and
a periscope assembly movable along a vertical axis in a telescoping relationship within the vertical cavity of the column assembly between a raised position in which the periscope assembly is retracted into the ceiling, and a lowered position in which the lower portion of the periscope assembly extends below the ceiling, said periscope assembly having:
(a) an upper mirror aligned to reflect images from the projector in a downward direction within the periscope assembly when the periscope assembly is in the lowered position; and
(b) a lower mirror aligned to reflect the images reflected by the upper mirror from the projector onto a viewing surface below the ceiling when the periscope assembly is in the lowered position.

13. The projection system of claim 12 further comprising a motor selectively moving the member between the raised position and the lowered position.

14. The projection system of claim 13 further comprising a worm gear mechanism driven by the motor to move the member between the raised position and the lowered position.

15. The projection system of claim 12 wherein the lower mirror and lower portion of the periscope assembly pass through an opening the ceiling in the lowered position, and further comprising a closure panel substantially covering the opening in the ceiling when the periscope assembly is in the raised position.

* * * * *